United States Patent [19]

Tajima et al.

[11] Patent Number: 4,626,121
[45] Date of Patent: Dec. 2, 1986

[54] PIVOT JOINT ASSEMBLY CAPABLE OF AMPLIFIED WEAR INDICATION

[75] Inventors: Takashi Tajima, Toyohashi; Tatsuyoshi Tsuji, Aichi, both of Japan

[73] Assignee: Musashi Seimitsu Kogyo Kabushiki Kaisha, Aichi, Japan

[21] Appl. No.: 755,611

[22] Filed: Jul. 16, 1985

[30] Foreign Application Priority Data

Jul. 19, 1984 [JP] Japan ................................ 59-150087

[51] Int. Cl.⁴ ...................... F16C 11/06; G01D 21/00
[52] U.S. Cl. ...................................... 403/27; 403/132; 403/138; 116/208; 116/283
[58] Field of Search ................. 403/27, 138, 132, 137, 403/135, 144, 133; 116/208, 281, 283; 188/1.11

[56] References Cited

U.S. PATENT DOCUMENTS 1,035,889  8/1912  McManus ........................... 116/283
3,813,178  5/1974  Herbenar et al.
3,960,457  6/1976  Gaines et al. .......................... 403/27
4,017,197  4/1977  Farrant ................................. 403/27

FOREIGN PATENT DOCUMENTS 1336087  11/1973  United Kingdom .

Primary Examiner—Cornelius J. Husar
Assistant Examiner—Peter M. Cuomo
Attorney, Agent, or Firm—Ladas & Parry

[57] ABSTRACT

A ball and socket joint for automotive wheel suspensions or the like has a ball stud extending into a housing through its open end. The ball end of the ball stud rotatably bears against a load carrying bearing and a wear takeup bearing within the housing, in which is also mounted a spring urging the wear takeup bearing toward the load carrying bearing. The wear takeup bearing has a protuberance extending through an aperture in a cover closing the housing end opposite to its open end. Fitted over the protuberance, a wear indicator cap is normally engaged therewith in a position close to the housing cover and is sprung or otherwise preloaded in a direction away therefrom. When the protuberance recedes into the housing to such an extent that the wear of the joint exceeds an acceptable limit, the wear indicator cap travels from the housing under the preload and comes to a stop on the distal end of the protuberance, indicating the wear of the joint in a greatly amplified, visually recognizable manner.

13 Claims, 9 Drawing Figures

PIVOT JOINT ASSEMBLY CAPABLE OF AMPLIFIED WEAR INDICATION

BACKGROUND OF THE INVENTION

This invention deals with pivot joint assemblies having provisions for indicating the wear of their component parts. More specifically, the invention pertains to a ball and socket joint, suitable for use in automotive wheel suspensions in particular, that makes a clearly discernible indication when the joint wears in use beyond a tolerable limit.

Wear indicating pivot joint assemblies are per se not new in the art. Examples of such known joints are described and claimed in U.S. Pat. No. 3,813,178 and British Pat. No. 1,336 087. Both suggest an externally visible protrusion that retracts into the joint housing with the development of wear. The full retraction of the protrusion into the housing indicates that the joint is worn enough to warrant replacement. These prior art devices are unsatisfactory, however, as the protrusion retracts at a rate equal to or less than the amount of the wear of the joint part. Thus the stroke of the protrusion is only from 1.0 to 1.5 millimeters. Moreover, since the protrusion initially projects to varying degrees because of unavoidable dimensional errors in manufacture, the visual recognition of the exact moment the conventional joints are in need of replacement has been difficult.

The noted U.S. Pat. No. 3,813,178 also teaches the use of a metal or plastic cap that is pressed or snapped on the protrusion. Being bottomed against the joint housing. the cap is released from the protrusion upon retraction thereof into the housing. The thus bared protrusion indicates, then, that the joint must be replaced.

The use of the cap is in itself favorable since it leads to a clearer indication of whether the joint is worn or not. However. the pressfitted cap has been easy to come off the protrusion in the use of the joint in a vehicular suspension, as by being hit by a stone that has been sent up by the vehicle. Additionally, after the detachment of the cap, either accidentally or otherwise, dust has been easy to accumulate on the bared protrusion, making it impossible to discern whether it is capped or uncapped.

SUMMARY OF THE INVENTION

The present invention remedies the foregoing difficulties heretofore encountered in the use of wear indicating pivot joint assemblies of the type defined and provides an improved device capable of making a remarkably clearer indication of whether it is in need of replacement or not.

Briefly, the improved pivot joint assembly in accordance with the invention comprises a stud member having ball or like head which is received in a joint housing or socket and which is held against its inside surface (either directly or via a load carrying bearing) in a manner subject to wear in use. The housing has mounted therein wear takeup means held against the head of the stud member for displacement therewith in a predetermined direction relative to the housing with the progress of the wear of the stud member and the surface contacting therewith. A protuberance on the wear takeup means extends through an aperture in a closed end of the housing and projects outwardly therefrom, in a direction away from the predetermined direction of the displacement of the wear takeup means, so that the protuberance recedes into the housing with the progress of wear. Mounted on the projecting part of the protuberance, a wear indicator cap is preloaded with respect to the protuberance in a direction away from the housing. The protuberance has first engagement means for normally holding the wear indicator cap in a first position on the protuberance, where the wear indicator cap is arranged for abutment against the closed end of the housing, and second engagement means for engaging the wear indicator cap in a second position thereon, which is farther away from the housing than is the first position.

Normally, or when the joint assembly is unworn, the wear indicator is in the first position on the protuberance and is held against the closed end of the housing. As the joint assembly is used in service and wear is compensated for by the displacement of the wear takeup means, the protuberance will retract into the housing, leaving behind the wear indicator cap in abutment against the housing, until the first engagement thereon releases the wear indicator cap when wear exceeds a tolerable degree. Thereupon the wear indicator cap will travel under the preload from the first to the second position on the protuberance, to be engaged in the latter position by the second engagement means on the protuberance. For preloading the wear indicator cap from the first toward the second position, either a spring may be employed, or the cap itself may be self biased to travel down a taper into which the protuberance is shaped.

Preferably, and as in the embodiments to be presented subsequently, the second position of the wear indicator is on the extreme end of the protuberance away from the joint housing. When wear developes beyond the limit, the wear indicator cap travels from the first to the second position. The distance between the first and second positions can of course be made much greater than the degree of retraction of the protuberance into the housing as a result of the wear of the joint. It can be stated, therefore, that the wear indicator cap greatly amplifies the displacement of the protuberance for clear indication of the fact that the joint should be replaced.

A further feature of the invention is the second engagement means which functions to positively holds the wear indicator cap in the second position against detachment from the protuberance. So retained in the second position on the protuberance, the wear indicator cap more clearly indicates the wear of the joint than if it is thrown on the protuberance as with the prior art. The first and second engagement means conjointly serve the additional purpose of preventing the wear indicator cap from accidental detachment from the protuberance in the service conditions of the joint assembly.

The above and other features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
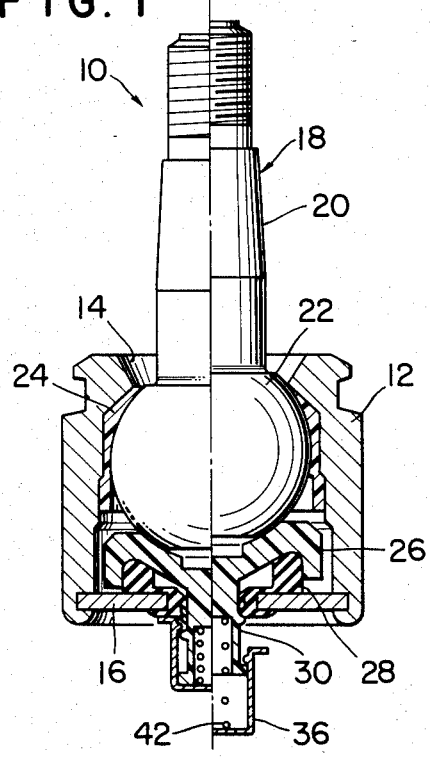
FIG. 1 is an axial section through the wear indicating pivot joint assembly embodying the principles of the present invention, the left hand half of the drawing showing the normal positions of the parts, and the right hand half of the drawing showing the positions of the parts when the joint assembly is worn beyond an acceptable limit.

The invention will now be described more specifically as embodied in the universal ball and socket joint assemblies shown in the attached drawings, which assemblies are used in tension in automotive front suspensions. With reference first to FIG. 1, the exemplified joint assembly 10 has a housing or socket member 12 of generally cylindrical shape. The housing 12 has a circular opening 14 at one end and is closed at another by a cover 16.

Extending into the housing 12 through the circular opening 14 is a ball stud 18 having a shank 20 with a terminal head herein shown as a ball 22. This ball is substantially thoroughly nested in the housing 12 and is rotatably supported therein by means set forth hereafter. The circular opening 14 is sufficiently large to accommodate the tilting motion of the ball stud 18 in any direction with the rotary displacement of the ball 22 relative to the housing 12.

Within the housing 12 the ball 22 bears against a load carrying bearing 24, disposed adjacent the opening 14, in such a way that the ball 22 and the bearing 24 are susceptible to wear in the use of the joint assembly 10. Also in sliding engagement with the ball 22 is a wear takeup bearing 26 disposed adjacent the end cover 16 of the housing 12. A wear takeup spring in the form of an elastomeric ring 28 is mounted in a precompressed state between end cover 16 and wear takeup bearing 26, as pictured in the left hand half of FIG. 1. The wear takeup spring ring 28 urges the ball 22 against the load carrying bearing 24, mostly toward the center of the opening 14 of the housing 12. The wear takeup bearing 26 and the wear takeup spring ring 28 constitute in combination the wear takeup means effective to hold the ball 22 in sliding engagement with the load carrying bearing 24 in the face of their wear. Thus, as will be seen from the right hand half of FIG. 1, the complete ball stud 18 travels away from the end cover 16 of the housing 12 with the development of wear. Of course, as the ball stud 18 travels away from the housing end cover 16, so does the wear takeup bearing 26 under the force of the wear takeup spring ring 28.

Figure 2:
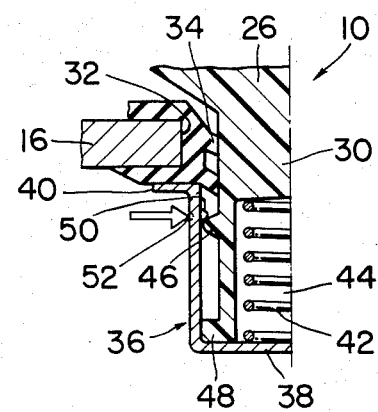
FIG. 2 is an enlarged, fragmentary axial section through the wear indicating means of the joint assembly of FIG. 1, shown in a state when the joint assembly is unworn as in the left hand half of FIG. 1.

Reference is now directed to FIG. 2 for a discussion of the wear indicator means incorporated with the joint assembly 10. Forming an important part of the wear indicator means is a cylindrical protuberance 30 projecting from the central portion of the wear takeup bearing 26. The protuberance 30 extends outwardly of the housing 12 through a circular aperture 32 defined centrally in its end cover 16. A sealing ring 34 of elastomeric material is interposed between housing end cover 16 and protuberance 30 for sealing the joint therebetween. It will be seen that as the wear takeup bearing 26 travels toward the open end 14 of the housing 12 with the wearing of the joint assembly 10, the protuberance 30 recedes into the housing through the end plate aperture 32.

Fitted over the projecting portion of the protuberance 30 is a wear indicator cap 36 in the form of a hollow cylinder closed at one end 38 and open at another, with a flange 40 on its open end. The wear indicator cap 36 is to be held in a first position on the protuberance 30, shown in the left hand half of FIG. 1 and in FIG. 2. in which the flange 40 butts on the housing end cover 16 via the sealing ring 34, when the joint assembly 10 is unworn. Upon development of wear beyond a tolerable limit, the wear indicator cap 36 is to travel to a second position on the protuberance 30, shown in the right hand half of FIG. 1, which position is farther away from the housing 12 than is the first position. Preferably, and as shown in FIG. 1, the second position of the wear indicator cap 36 is on the extreme end of the protuberance 30. The distance between the first and second positions should at any event be greater than the degree to which the protuberance 30 recedes into the housing 12 to the time of replacement of the joint assembly 10. The wear indicator cap 36 is preloaded from the first toward the second position by a helical compression spring 42 received in a hollow 44 in the protuberance 30

The protuberance 30 has first and second annular ridges 46 and 48 formed in longitudinally spaced apart positions thereon for holding the wear indicator cap 36 in the first and second positions, respectively. The wear indicator cap 36 has a plurality of inward projections 50, one seen in FIG. 2, in circumferentially spaced apart positions thereon for engagement with the annular ridges 46 and 48.

For the assemblage of the wear indicator means constructed as in the foregoing, the compression spring 42 is first inserted in the hollow 44 in the protuberance 30. Then the wear indicator cap 36 is pressed fully onto the protuberance 30 until its flange 40 come into abutment against the housing end cover 16 via the sealing ring 34, thereby compressing the spring 42. This compression of the spring 42 serves for preloading the wear indicator cap 36 away from housing end cover 16. Then, for positively holding the wear indicator cap 36 in that position, the cap may be punched inwardly in several circumferentially spaced apart positions thereon, as indicated by the arrow 52 in FIG. 2, thereby creating the desired inward projections 50 in engagement with the first annular ridge 46 on the protuberance 36.

In the use of this ball and socket joint assembly 10, the protuberance 30 will gradually retract into the housing 12 as the wear takeup bearing 26 travels toward the open end 14 of the housing 12 under the bias of the wear takeup spring 28 with the wear of the ball 22 and load carrying bearing 24. When the wear exceeds an acceptable limit, the inward projections 50 of the wear indicator cap 36 will ride over the first ridge 46 on the protuberance 30, the wear indicator cap being restrained from travel with the protuberance by the housing end cover 16 in abutting engagement with its flange 40.

Then, as indicated in the right hand half of FIG. 1, the compression spring 42 will force the wear indicator cap 36 from the first to the second position on the protuberance 30. In this second position the wear indicator cap 36 will engage the second annular ridge 48 on the distal end of the protuberance 30 with its inward projections 50. Thus positively engaged on the distal end of the protuberance 30, the wear indicator cap 36 visibly indicates that the joint assembly 10 is worn enough to be replaced. It will be appreciated that, traveling from the first to the second position as above, the wear indicator cap 36 serves to greatly amplify the minute displacement of the protuberance 30 with the development of wear.

Second Form

Figure 4:
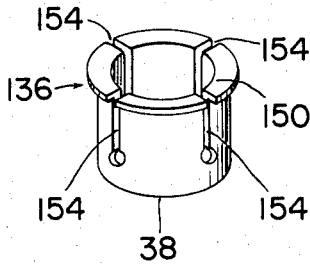
FIG. 4 is a perspective view of the wear indicator cap of the pivot joint assembly of FIG. 3.
Figure 3:
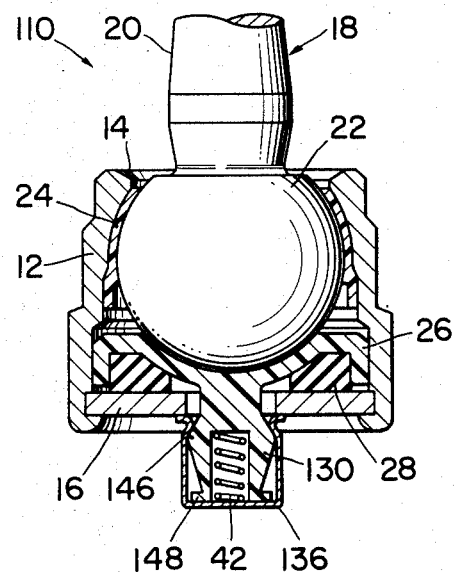
FIG. 3 is an axial section through another preferred form of the wear indicating pivot joint assembly in accordance with the invention, shown in a state when the joint assembly is unworn.
Figure 5:
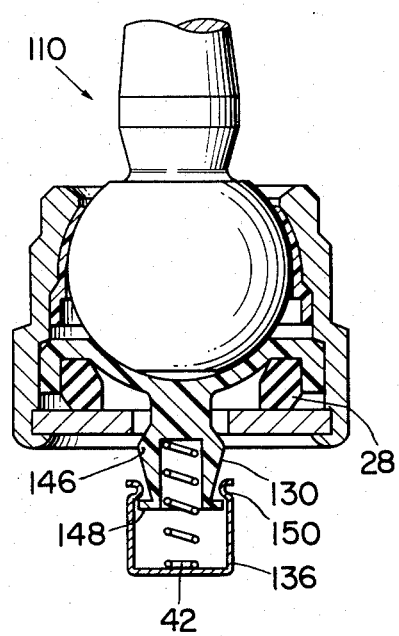
FIG. 5 is a view similar to FIG. 3 except that the joint assembly is shown in a state after having been worn beyond an acceptable limit.

In FIGS. 3 through 5 is shown another preferred form of the wear indicating joint assembly in accordance with the invention. Generally labeled 110, this joint assembly has a protuberance 130 which is substantially rhombus shaped in longitudinal section, having an annular ridge 146. This annular ridge is located externally of, and appropriately close to, the joint housing end cover 16 to serve as the first engagement means for holding a correspondingly modified wear indicator cap 136 in the first position on the protuberance 130. The protuberance 130 tapers from the annular ridge 146 toward its distal end and terminates in a flange 148 serving as the second engagement means for holding the wear indicator cap 136 in the second position on the protuberance.

As best illustrated in FIG. 4, the wear indicator cap 136 has a constricted neck 150 for engagement with the ridge 146 and flange 148 on the protuberance 130. The wear indicator cap 136 further differs from the cap 36 of the FIGS. 1 and 2 joint assembly 10 in having one or more, four in this particular embodiment, slits 154 extending longitudinally from the open end of the cap and terminating short of its closed end 38, so that the open end portion of the cap 136 is resiliently expansible in its diametric direction. The other details of construction of this joint assembly 110 are substantially as set forth above in connection with the joint assembly 10.

When the joint assembly 110 is unworn, the wear indicator cap 136 is in the first position on the protuberance 130, as shown in FIG. 3, with its constricted neck 150 engaging the annular ridge 146 of the protuberance and with its open end butting against the end cover 16 of the joint housing 12. The spring 42 is precompressed to bias the wear indicator cap 136 away from the housing end cover 16.

Then, when the joint assembly 110 is worn beyond a predetermined limit, the constricted neck 150 of the wear indicator cap 136 will ride over the annular ridge 146 of the protuberance 130 since the cap is expansible as aforesaid in its diametric direction by virtue of the longitudinal slits 154 cut therein. The compression spring 42 will then urge the cap 136 away from the housing end cover 16 until, recontracted, the cap reengages the terminal flange 148 of the protuberance 130 with its constricted neck 150.

Third Form

The slitted wear indicator cap 136 of the preceding embodiment was intended to enable the cap to ride over the first engagement means 146 on the protuberance 130. It is self evident, then, that the wear indicator cap can likewise ride over the first engagement means if the protuberance, instead of the cap itself, is slitted for contraction in its diametric direction.

Figure 6:
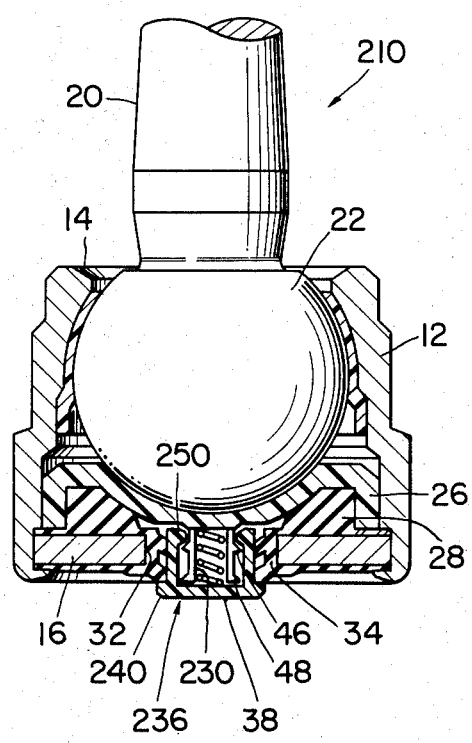
FIG. 6 is an axial section through still another preferred form of the wear indicating pivot joint assembly in accordance with the invention.
Figure 7:
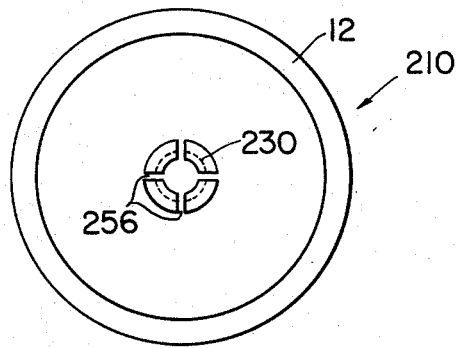
FIG. 7 is a bottom plan view of the pivot joint assembly of FIG. 6.

Thus, in a wear indicating ball and socket joint assembly 210 shown in FIGS. 6 and 7 by way of a further preferable embodiment of the invention, a protuberance 230 has several slits 256 formed longitudinally therein, as better seen from the bottom plan view of FIG. 7. The wear indicator cap has been omitted from FIG. 7 to clearly reveal the slitted protuberance 230. It will also be discerned from FIG. 6 that the protuberance 230 is mostly concealed in the aperture 32 in the end cover 16 of the joint housing 12. The protuberance 230 is shown to be similar in the other respects to the protuberance 30 of the joint assembly 10, having the annular ridges 46 and 48 in longitudinally spaced apart positions thereon.

Fitted over the protuberance 230, a wear indicator cap 236 has a flange 240 on its closed end 38 and an inturned rim 250 on its open end. The flange 240 butts on the housing end cover 16 via the sealing ring 34 when the wear indicator cap 236 is in the first position on the protuberance 230, with its inturned rim 250 engaging the first annular ridge 46 on the protuberance. The wear indicator cap 236 is therefore mostly received in the joint housing 12 when the joint assembly 210 is unworn, quite unlike the thoroughly exposed wear indicator caps 36 and 136 of the foregoing joint assemblies 10 and 110. This joint assembly 210 is analogous in the other details of construction with the joint assemblies 10 and 110.

When wear developes beyond the tolerable degree in this joint assembly 210, the inturned rim 250 of the wear indicator cap 236 will ride over the first annular ridge 46 on the slitted protuberance 230, causing same to contract diametrically in so doing. Then the wear indicator cap 236 will be sprung into reengagement with the second annular ridge 48 on the protuberance 230. Now the wear indicator cap Z36 will be clearly visible, being mostly exposed from the joint housing 12.

Fourth Form

Figure 8:
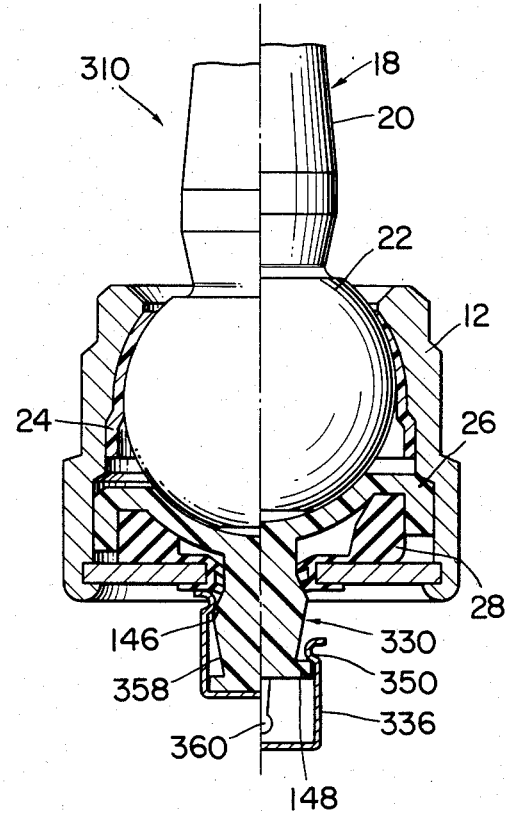
FIG. 8 is a view similar to FIG. 1 but showing a further preferred form of the wear indicating pivot joint assembly in accordance with the invention.
Figure 9:
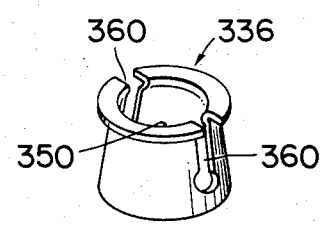
FIG. 9 is a perspective view of the wear indicator cap of the pivot joint assembly of FIG. 8.

A still further example of wear indicating ball and socket joint assembly 310 shown in FIGS. 8 and 9 differs from all the foregoing embodiments in having no spring for preloading the wear indicator cap from the first toward the second position on the protuberance. As seen in FIG. 8, the protuberance 330 of this joint assembly 310 is similar in shape to the protuberance 130 of the FIG. 3 joint assembly 110 except that the former has no hollow for accommodating the spring. Thus the protuberance 330 has a taper 358 extending from the annular ridge 146 to the terminal flange 148.

FIG. 9 indicates that the wear indicator cap 336 of this joint assembly 310 has a pair of relatively wide slits 360 in diametrically opposite positions extending longitudinally from its flanged open end and terminating short of its closed end. Further the wear indicator cap 336 is self biased radially inwardly, particularly at and adjacent its open end having the constricted neck 350. The other structural details of the joint assembly 310 can be substantially as set forth above in conjunction with the foregoing embodiments.

When the joint assembly 310 is unworn, the wear indicator cap 336 engages the annular ridge 146 of the protuberance 330 with its constricted neck 350, as indicated in the left hand half of FIG. 8. Upon development of wear beyond the prescribed limit, the constricted neck 350 of the wear indicator cap 336 will ride over the ridge 146 of the protuberance 330, the cap being elastically expansible in diameter owing to the provision of the slits 360. Then the wear indicator cap 336 will slide down the taper 358 of the protuberance 330 by virtue of its own radially inward self bias, until its constricted neck 350 comes into engagement with the terminal flange 148 of the protuberance, as depicted in the right hand half of FIG. 8.

The wear indicator cap 336 of this joint assembly 310 is per se self biased radially inwardly. However, since the protuberance 330 for use with the wear indicator cap 336 tapers from the first toward the second engagement means, the cap when taken together with the tapering protuberance can be thought of as being essentially preloaded from the first toward the second position on the protuberance, as in all the other embodiments disclosed herein.

It is to be understood that the foregoing embodiments are meant purely illustrate or explain and not to impose limitations upon the invention, as various modifications or alterations of such specific embodiments will readily occur to one skilled in the art within the broad teaching hereof. For example, the provision of the discrete load carrying bearing is not an essential feature of this invention; the head of the stud member may bear directly against the inside surface of the joint housing. Also, the protuberance may not necessarily be an integral part of the wear takeup bearing but may be a separate part joined thereto in any convenient manner.

What is claimed is:

1. A pivot joint assembly capable of amplified wear indication, comprising:
   (a) a housing open at one end and closed at another end, the closed end of the housing having an aperture defined therein;
   (b) a stud member having a shank extending into the housing through the open end thereof and terminating in a head supported within the housing in a manner subject to wear in use;
   (c) wear takeup means mounted within the housing adjacent the closed end thereof and held against the head of the stud member for displacement therewith toward the open end of the housing with the progress of wear;
   (d) a protuberance on the wear takeup means extending through the aperture in the closed end of the housing, the protuberance receding into the housing with the development of wear;
   (e) a wear indicator cap mounted on the protuberance on the wear takeup means and preloaded with respect to the protuberance in a direction away from the housing:
   (f) first engagement means on the protuberance for normally holding the wear indicator cap in a first position on the protuberance, where the wear indicator cap is arranged for abutment against of the housing, the first engagement means allowing the wear indicator cap to travel under the preload to a second position on the protuberance, farther away from the housing than the first position, when the wear developes beyond an acceptable limit; and
   (g) second engagement means on the protuberance for engaging the wear indicator cap in the second position.

2. The pivot joint assembly of claim 1 wherein the wear indicator cap is preloaded by a spring mounted between the protuberance on the wear takeup means and the wear indicator cap.

3. The pivot joint assembly of claim 1 wherein the wear takeup means comprises:
   (a) a wear takeup bearing held against the head of the stud member; and
   (b) a wear takeup spring acting between the wear takeup bearing and the closed end of the housing to urge the the wear takeup bearing against the head of the stud member;
   (c) the protuberance being formed integral with the wear takeup bearing.

4. The pivot joint assembly of claim 1 wherein the first and second engagement means are first and second annular ridges, respectively, formed in longitudinally spaced apart positions on the protuberance.

5. The pivot joint assembly of claim 4 where the wear indicator cap is externally indented in circumferentially spaced apart positions to provide a plurality of inward protrusions for engagement with the first and second annular ridges on the protuberance.

6. The pivot joint assembly of claim 1 wherein the protuberance on the wear takeup means is substantially rhombus shaped in longitudinal section, having an annular ridge as the first engagement means and tapering from the annular ridge toward its end away from the wear takeup means, and wherein the protuberance has a flange on its end away from the wear takeup means as the second engagement means.

7. The pivot joint assembly of claim 6 wherein the wear indicator cap is slitted longitudinally and self biased radially inwardly. whereby on being released from the annular ridge of the protuberance, the wear indicator cap travels down the taper of the protuberance by virtue of the radially inward self bias into engagement with the terminal flange on the protuberance.

8. The pivot joint assembly of claim 1 wherein the wear indicator cap has a constricted neck for engagement with the first and second engagement means on the protuberance.

9. The pivot joint assembly of claim 1 wherein the wear indicator cap is slitted longitudinally for expansion in its diametric direction in riding over the first engagement means on the protuberance.

10. The pivot joint assembly of claim 1 wherein the protuberance on the wear takeup means is slitted longitudinally for contraction in its diametric direction in allowing the wear indicator cap to ride over the first engagement means thereon.

11. The pivot joint assembly of claim 1 wherein the wear indicator cap when in the first position on the protuberance is adapted to butt on the closed end of the housing at its end close to the housing, whereby the wear indicator cap is thoroughly exposed from the housing when in the first position on the protuberance.

12. The pivot joint assembly of claim 1 wherein the wear indicator cap when in the first position on the protuberance is adapted to butt on the closed end of the housing at its end away from the housing, whereby the wear indicator cap is mostly concealed in the housing when in the first position on the protuberance.

13. The pivot joint assembly of claim 1 further comprising a load carrying bearing mounted within the housing adjacent the open end thereof for sliding engagement with the head of the stud member, the head and the load carrying bearing being both subject to wear in use.

* * * * *